(12) United States Patent
Platonov et al.

(10) Patent No.: US 8,929,604 B2
(45) Date of Patent: Jan. 6, 2015

(54) VISION SYSTEM AND METHOD OF ANALYZING AN IMAGE

(75) Inventors: Juri Platonov, Grünwald (DE); Alexey Pryakhin, München (DE); Peter Kunath, München (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 440 days.

(21) Appl. No.: 13/293,007

(22) Filed: Nov. 9, 2011

(65) Prior Publication Data

US 2012/0114178 A1 May 10, 2012

(30) Foreign Application Priority Data

Nov. 9, 2010 (EP) ..................................... 10014418

(51) Int. Cl.
- *G06K 9/00* (2006.01)
- *G01C 22/00* (2006.01)
- *G01C 21/36* (2006.01)

(52) U.S. Cl.
CPC ........ *G01C 21/3602* (2013.01); *G06K 9/00791* (2013.01); *G06K 2209/27* (2013.01)
USPC .............................................. 382/104; 701/28

(58) Field of Classification Search
None
See application file for complete search history.

(56) References Cited

U.S. PATENT DOCUMENTS

| | | | |
|---|---|---|---|
| 5,144,685 A * | 9/1992 | Nasar et al. ................... | 382/153 |
| 7,774,158 B2 * | 8/2010 | Domingues Goncalves et al. ............................ | 702/152 |
| 8,649,565 B1 * | 2/2014 | Kim et al. ...................... | 382/106 |
| 2001/0029428 A1 | 10/2001 | Huertgen et al. | |
| 2003/0167120 A1 * | 9/2003 | Kawasaki ...................... | 701/209 |
| 2004/0167667 A1 * | 8/2004 | Goncalves et al. ............ | 700/245 |
| 2004/0167669 A1 * | 8/2004 | Karlsson et al. ............... | 700/259 |
| 2004/0167670 A1 * | 8/2004 | Goncalves et al. ............ | 700/259 |
| 2004/0167688 A1 * | 8/2004 | Karlsson et al. ................ | 701/23 |
| 2004/0167716 A1 * | 8/2004 | Goncalves et al. ............ | 701/217 |
| 2004/0168148 A1 * | 8/2004 | Goncalves et al. ............ | 717/104 |
| 2005/0182518 A1 * | 8/2005 | Karlsson ........................ | 700/253 |
| 2005/0234679 A1 * | 10/2005 | Karlsson ........................ | 702/181 |
| 2005/0238200 A1 | 10/2005 | Gupta et al. | |
| 2006/0012493 A1 * | 1/2006 | Karlsson et al. .......... | 340/995.24 |
| 2006/0195858 A1 | 8/2006 | Takahashi et al. | |
| 2008/0056535 A1 | 3/2008 | Bergmann et al. | |
| 2008/0059199 A1 | 3/2008 | Hataoka et al. | |
| 2010/0009662 A1 * | 1/2010 | Khosravy et al. .......... | 455/414.1 |
| 2010/0149399 A1 * | 6/2010 | Mukai et al. ............. | 348/333.02 |
| 2010/0176987 A1 * | 7/2010 | Hoshizaki ................ | 342/357.02 |

(Continued)

OTHER PUBLICATIONS

Ach et al., "Classification of traffic signs in real-time on a multi-core processor", Intelligent Vehicles Symposium, 2008 IEEE, pp. 313-318.

(Continued)

*Primary Examiner* — Wenpeng Chen
(74) *Attorney, Agent, or Firm* — O'Shea Getz P.C.

(57) ABSTRACT

A vision system comprises a camera that captures an image and a processor coupled to process the received image to determine at least one feature descriptor for the image. The processor includes an interface to access annotated map data that includes geo-referenced feature descriptors. The processor is configured to perform a matching procedure between the at least one feature descriptor determined for the at least one image and the retrieved geo-referenced feature descriptors.

18 Claims, 6 Drawing Sheets

(56) References Cited

U.S. PATENT DOCUMENTS

| | | | |
|---|---|---|---|
| 2010/0310182 A1* | 12/2010 | Kroepfl et al. | 382/216 |
| 2011/0090071 A1 | 4/2011 | Platonov et al. | |
| 2011/0150324 A1* | 6/2011 | Ngan et al. | 382/159 |
| 2012/0106847 A1* | 5/2012 | Qi | 382/195 |
| 2012/0113138 A1* | 5/2012 | Uusitalo et al. | 345/629 |
| 2012/0121161 A1* | 5/2012 | Eade et al. | 382/153 |

OTHER PUBLICATIONS

Benesova et al., "A mobile system for vision based road sign inventory", Proc. 5th International Symposium on Mobile Mapping Technology (MMT 2007), 5 pages.

Yan et al., "Exploring feature descriptors for face recognition", IEEE International Conference on Acoustics, Speech, and Signal Processing (ICASSP07), IEEE-ICASSP 2007: 1-629 (2007).

* cited by examiner

VISION SYSTEM AND METHOD OF ANALYZING AN IMAGE

CLAIM OF PRIORITY

This patent application claims priority from EP Application No. 10 014 418.7 filed Nov. 9, 2010, which is hereby incorporated by reference.

FIELD OF TECHNOLOGY

The invention relates to a vision system, and in particular to an automated vehicle vision system.

RELATED ART

Machine vision is practiced in a wide variety of systems. Recently, applications that employ vision systems in automotive environments have been contemplated for safety or other applications. In particular, image recognition in automotive systems may be employed for various purposes including navigation or aiding the driver in controlling a vehicle. For these purposes, images of a neighborhood of the vehicle are recorded, frequently by a camera onboard a vehicle, and analyzed in order to identify objects (e.g., roads or road edges), that may be of relevance for navigation purposes or for controlling the vehicle. Once an object has been identified or recognized in an image, specific processes may be invoked. For example, the driver of a vehicle may be informed of a Point of Interest (POI). Additional applications include the provision of driving directions in vehicle navigation or vehicle safety devices.

There are various difficulties associated with automatically performing object recognition. For example, at least a certain degree of robustness against varying lighting conditions or varying viewing directions should be provided. However, this represents a considerable challenge. For certain applications, such as the recognition of human faces in security applications, the potential of so-called feature descriptors has been explored. For example, Shuicheng Yan et al., in the publication entitled "*Exploring Feature Descriptors for Face Recognition*", IEEE International Conference on Acoustics, Speech, and Signal Processing (ICASSP07), IEEE-ICASSP 2007: I-629 (2007) discloses the use of feature descriptors for face recognition.

Object recognition in vehicular applications has so far mainly focused on recognizing lane boundaries or traffic signs. Various methods, including neural network or discriminators, may be employed to this end. For example, R. Ach et al., in the publication entitled "*Classification of Traffic Signs in Real-Time on a Multi-Core Processor*", Intelligent Vehicles Symposium, 2008 IEEE, pp. 313-318 (2008) describe a method of performing traffic sign recognition using a neural network trained for certain types of traffic signs.

While techniques applied to prior art vehicle vision systems may be useful to reliably classify objects into one of a limited number of classes, such as for detecting traffic signs, road markings or other vehicles, such applications do generally not allow specific POIs to be reliably identified. For example, it may be desirable to identify certain buildings or other landmarks to provide information related to such POIs to a user. However, techniques such as the ones described above may not be suitable to identify such landmarks unless, for example, a neural network has specifically been trained for them. Identifying landmarks may not only be advantageous with a view to providing additional information to a user, but also with a view to positioning accuracy.

There is a need for an improved automated vision system and methods of analyzing an image. In particular, there is a need for a system and method that identifies objects, such as points of interest, in an image recorded in a vehicular application. There is also a need for such a system and method which allows the object recognition to be performed in a robust and fast manner.

SUMMARY OF THE INVENTION

A vision system comprises a camera and a processor. The camera captures at least one image, and the processor is coupled to the camera and configured to determine at least one feature descriptor for the at least one image. The processor has an interface to access annotated map data that includes geo-referenced feature descriptors to retrieve a plurality of geo-referenced feature descriptors and position information respectively associated with the geo-referenced feature descriptors. The processor is configured to perform a matching procedure between the at least one feature descriptor determined for the at least one image and the retrieved geo-referenced feature descriptors.

The vision system utilizes the annotated map data, which may include geo-referenced feature descriptors. By matching feature descriptors determined for the image and the geo-referenced feature descriptors of the annotated map data, information stored in the annotated map data may be utilized to identify objects for which an associated geo-referenced feature descriptor is included in the annotated map data. Recognition of the object may, on average, be performed faster and more robustly than in cases where no a-priori information is used, and/or the results of the matching may be utilized to determine a position more accurately. Utilizing feature descriptors provides robustness against a variety of different environmental conditions, such as different lighting conditions.

The vision system may in particular be a vision system installed in a motor vehicle.

The camera may capture a 2D image, or a sequence of 2D images. In addition, the camera may comprise a 3D camera employed to facilitate image segmentation.

The processor may include several integrated circuits, which may be dedicated circuits or general purpose processor circuits programmed for performing the acts described herein using suitable firmware or software.

The processor may be configured to determine a feature vector for the image, which includes several feature descriptors. Similarly, the annotated map data may include a plurality of geo-referenced feature vectors. It will be appreciated that it is not required for each feature descriptor included in the annotated map data to be individually associated with position information. Rather, the annotated map data may be organized such that there may be position information associated with a feature vector. The processor may be configured to perform the matching procedure between a feature vector, or several feature vectors, determined for the image and geo-referenced feature vectors included in the annotated map data. Various matching procedures may be utilized, such as matching based on an overlap of feature vectors, Euclidean distances between feature vectors, or similar.

The processor may be configured to identify a set of geo-referenced feature descriptors matching a plurality of feature descriptors determined for the at least one image, and to determine three coordinates of a vehicle orientation based on the position information associated with the set of geo-referenced feature descriptors. This allows the orientation of the vehicle to be established based on the image. In order to identify geo-referenced feature descriptors matching the plurality of feature descriptors determined for the at least one image, a tree search or another efficient search may be performed in the annotated map data. In augmented reality applications, the processor may use the three coordinates of the vehicle orientation to control an optical output device. The processor may control the optical output device such that a location at which processor-generated graphics are superimposed on captured image data is set based on the determined three coordinates of the vehicle orientation.

The processor may be configured such that it determines a plurality of angles, e.g., three Euler angles, which represent the vehicle orientation in space.

For at least some of the geo-referenced feature descriptors, the associated position information may include a height coordinate. For at least some of the geo-referenced feature descriptors, the associated position information may include a pair of lateral coordinates and a height coordinate, which may be used to determine the three coordinates of the vehicle orientation. The processor may be configured to determine the three coordinates of the vehicle orientation based on the lateral coordinates and the height coordinate of the position information of geo-referenced feature descriptors, and further based on the locations at which the matching feature descriptors are located in the captured at least one image.

The information on the vehicle orientation may be used for various purposes. For illustration, augmented reality applications are anticipated to be employed in future vehicle navigation devices, which require information not only on the position, but also on the orientation of the vehicle. The processor may provide the information on the orientation to an application, in particular an augmented reality application, resident in a navigation device of a vehicle.

The vision system may comprise a positioning device configured to determine a position of the vision system. For a vision system installed in a vehicle, the position may be the vehicle position. The processor may be coupled to the positioning device and retrieve the plurality of geo-referenced feature descriptors based on the determined position of the vision system. Thereby, information on feature descriptors corresponding to objects located in proximity to the vehicle may be selectively retrieved.

The processor may be configured to estimate a location of an object in the at least one image based on a position information associated with at least one of the retrieved geo-referenced feature descriptors and based on the vision system position. This allows the a-priori information provided by the annotated map data to be utilized in identifying known objects in an image.

The positioning device may be configured to determine an orientation of the vision system, which may be defined to be the orientation of the optical axis of the camera. For a vision system installed in a vehicle, the positioning device may determine the vehicle orientation. The processor may be configured to estimate the location of the object in the image further based on the orientation of the vision system. This allows the location of the object to be estimated with even higher precision. The accuracy and/or speed of object recognition may, on average, be enhanced.

The processor may be configured to identify a portion of the at least one image based on the vision system position and based on position information associated with at least one of the plurality of retrieved geo-referenced feature descriptors. The processor may be configured to selectively determine the at least one feature descriptor for the identified portion of the image. The processing speed may, on average, be enhanced by limiting the processing performed by the processor to the portion of the image, which is smaller in size than the image. The processor may be configured to determine a feature vector for the portion of the image.

The geo-referenced feature descriptors included in the annotated map data may respectively be associated with at least one of a plurality of object categories. The processor may be configured to selectively perform the matching between the at least one feature descriptor determined for the at least one image and the retrieved geo-referenced feature descriptors that are associated with a selected object category. Depending on the specific application, various categories may be implemented. For illustration, for vehicle vision systems, it may be desirable to have a category for historical buildings, another category for gas stations, etc. By performing the matching selectively, only objects belonging to a category selected by a user may be identified and, for example, highlighted on an optical output device, or other information associated with the object may be output. Alternatively, the matching may be performed in a non-selective manner, while the outputting of information may be selectively performed, when a match has been found, based on whether the geo-referenced feature descriptor(s) matching the feature descriptor(s) determined for the image have the selected category.

The vision system may include an optical output device. The processor may be configured to control the optical output device to output information indicating an object in the at least one image which has a feature descriptor matching one of the retrieved geo-referenced feature descriptors. This allows information to be specifically assigned to objects in the user's field of view.

At least one of the geo-referenced feature descriptors may have associated position information that includes height information. The processor may be configured to perform the matching procedure based on the height information. By utilizing height information, possibly in addition to information on lateral coordinates associated with a geo-referenced feature descriptor, it is possible to identify all three parameters specifying the vehicle orientation in space (e.g., Euler angles) using the matching procedure. If the position and/or vehicle orientation are determined independently of the image, the robustness and speed of object recognition may be enhanced.

The vision system may include a database comprising the annotated map data. The processor may be coupled to the database via the interface. For a vehicle vision system, the database may be provided onboard the vehicle. For a vision system installed in a portable device, the database may be stored within the portable device.

The vision system may include a wireless communication device coupled to the processor. The processor may be configured to transmit a request message via the wireless communication device to request transmission of the plurality of geo-referenced feature descriptors. The request message may include information on a position estimate. Thereby, the vision system may be utilized in community scenarios in which a central server maintains the annotated map data and provides information retrieved therefrom to a client vision system, upon request of the vision system.

Alternatively or additionally, when the vision system includes a wireless communication device, the processor may be configured to transmit the at least one feature descriptor determined for the at least one image via the wireless communication device. The processor may be configured to transmit the at least one feature descriptor selectively if no match is found in the feature descriptors included in the annotated map data. Thereby, additional information may be provided, by the vision system, to a central server for inclusion in the annotated map data. The vision system may have a user interface which allows a user to input additional information for transmission with the at least one feature descriptor. Alternatively or additionally, the captured image rather than the feature descriptor determined for the at least one image may be transmitted to the central server.

According to another embodiment, a vehicle is provided which comprises the vision system.

According to another embodiment, a method of analyzing at least one image, in particular for analyzing at least one image captured onboard a vehicle, is provided. At least one feature descriptor is determined for the at least one image. A plurality of geo-referenced feature descriptors and position information respectively associated with the geo-referenced feature descriptors is retrieved. A matching procedure between the at least one feature descriptor determined for the at least one image and the retrieved geo-referenced feature descriptors is performed.

The method utilizes the annotated map data that includes geo-referenced feature descriptors. By matching feature descriptors determined for the image and the geo-referenced feature descriptors of the annotated map data, information stored in the annotated map data may be utilized to identify objects for which an associated geo-referenced feature descriptor is included in the annotated map data. Recognition of the object may, on average, be performed faster and more robustly than in cases where no a-priori information is used, and/or the results of the matching may be utilized to determine a position more accurately. Utilizing feature descriptors provides robustness against a variety of different environmental conditions, such as different lighting conditions.

The method may comprise steps of identifying a set of geo-referenced feature descriptors matching a plurality of feature descriptors determined for the at least one image, and of determining three coordinates of a vehicle orientation based on the position information associated with the set of geo-referenced feature descriptors.

The method may comprise a step of determining three coordinates of a vehicle orientation based on the position information associated with the set of geo-referenced feature descriptors. The three coordinates of the vehicle orientation may include three angles (e.g., three Euler angles) defining the vehicle orientation. For at least some geo-referenced feature descriptors of the set, the associated position information may include height information. The position information may respectively include a pair of lateral coordinates and the height information. The height information and the lateral coordinates may be used to determine the three coordinates of the vehicle orientation. The three coordinates of the vehicle orientation may be determined based on the lateral coordinates and the height coordinate of the position information of geo-referenced feature descriptors, and further based on the locations at which the matching feature descriptors are located in the captured at least one image.

An optical output device may be controlled based on the three determined coordinates of the vehicle orientation when an augmented reality mode is activated. A position at which computer-generated graphics is superimposed on captured image data may be determined based on the three determined coordinates of the vehicle orientation. An orientation at which computer-generated graphics is superimposed on captured image data may be determined based on the three determined coordinates of the vehicle orientation.

The method may comprise determining a vehicle position, the plurality of geo-referenced feature descriptors being retrieved based on the determined vehicle position.

The method may comprise estimating a location of an object in the at least one image based on a position information associated with at least one of the retrieved geo-referenced feature descriptors and based on the determined vehicle position.

The method may comprise determining a vehicle orientation, the location of the object being estimated based on the vehicle orientation.

The method may comprise identifying a portion of the at least one image based on the vehicle position and based on position information associated with at least one of the plurality of retrieved geo-referenced feature descriptors. The at least one feature descriptor may then be selectively determined for the identified portion of the image.

The geo-referenced feature descriptors of the annotated map data may respectively be associated with at least one of a plurality of object categories. The matching procedure between the at least one feature descriptor determined for the at least one image and the retrieved geo-referenced feature descriptors may be performed selectively for those geo-referenced feature descriptors which are associated with a selected object category.

The method may comprise outputting information indicating an object in the at least one image which has a feature descriptor matching one of the retrieved geo-referenced feature descriptors.

At least one of the geo-referenced feature descriptors may have an associated position information including a height information. The matching procedure may then be performed based on the height information.

The method may comprise a step of transmitting, using a wireless communication device, a request message to request transmission of the plurality of geo-referenced feature descriptors.

Alternatively or additionally, the method may comprise transmitting, using a wireless communication device, the at least one feature descriptor determined for the at least one image.

The method may be performed by a vision system of any one aspect or embodiment.

While it is anticipated that the one field of application of embodiments will be vision systems installed in vehicles, embodiments of the invention are not restricted thereto. Rather, vision systems or methods according to various embodiments may be employed in a wide variety of applications. For illustration, portable devices featuring a camera may be configured so as to determine feature descriptors for a captured image. A matching of the determined feature descriptor and a-priori established information may be performed by accessing a database storing geo-referenced feature descriptors. The database may be installed locally in the portable device, or the portable device may wirelessly communicate with a central database to perform the matching.

These and other objects, features and advantages of the present invention will become apparent in light of the detailed description of the best mode embodiment thereof, as illustrated in the accompanying drawings. In the figures, like reference numerals designate corresponding parts.

DESCRIPTION OF THE DRAWINGS

Embodiments of the invention will be described with reference to the accompanying drawings.

DETAILED DESCRIPTION OF THE INVENTION

Embodiments of the invention will be described with reference to the drawings. While some embodiments will be described in the context of vehicle vision systems, the systems and devices of various embodiments may be employed in a wide variety of applications. The features of embodiments may be combined with each other unless specifically stated otherwise.

According to embodiments, geo-referenced feature descriptors, which may be combined to form geo-referenced feature vectors, are utilized for object recognition in an automated vision system. As used herein, the term "geo-referenced" refers to a quantity that is associated with at least a pair of coordinates specifying the lateral position of an object associated with the quantity. For example, a geo-referenced feature descriptor is a feature descriptor that is associated with at least a 2-tuple of coordinates, which represent a position or position estimate of the object represented by the geo-referenced feature descriptor. Optionally, height information may be provided for at least some of the geo-referenced feature descriptors, in which case the geo-referenced feature descriptors are associated with a 3-tuple of coordinates. While reference is generally made to feature descriptors herein, it will be appreciated that the feature descriptors may be combined into feature vectors, which are utilized in vision systems and methods of various embodiments.

The geo-referenced feature descriptors may be included in a database that will be referred to as "annotated map data" herein. As used herein, the term "annotated map data" refers to a map (e.g., digital map) that includes information on the visual appearance of objects, stored in association with position information for the respective object. The information on the visual appearance may in particular be in the form of feature descriptors. In the following, the term "annotated map data" in particular refers to map data which includes feature descriptors which are respectively associated with 2- or 3-tuples representing coordinates.

The feature descriptors utilized in the systems or methods may be determined according to any technique that provides at least some degree of robustness against varying conditions, such as varying lighting conditions or slightly varying viewing directions. Methods for determining such feature descriptors are known in the art. For illustration rather than limitation, the feature descriptor determined for the at least one image, and the geo-referenced feature descriptors included in the annotated map data, may be selected from a group comprising a Scale-Invariant Feature Transform (SIFT) descriptor, a Speeded Up Robust Features (SURF) descriptor, a Rotation Invariant Feature Transform (RIFT) descriptor, a Generalized Robust Invariant Feature (G-RIF) descriptor, a Principal Components Analysis SIFT (PCA-SIFT) descriptor or a Gradient Location and Orientation Histogram (GLOH) descriptor.

In various embodiments, the geo-referenced feature descriptors of the annotated map data may be utilized for image analysis in various ways. The geo-referenced feature descriptors and their associated position information may be utilized to enhance speed and robustness of object recognition. Additionally or alternatively, the geo-referenced feature descriptors and their associated position information may be utilized to determine an orientation of a vehicle, or more generally the orientation of the vision system relative to a frame of reference. Additionally or alternatively, the geo-referenced feature descriptors and their associated position information may be utilized to determine a position of the vision system, or a vehicle in which it is installed, with enhanced accuracy. To this end, feature descriptors determined for an image may be matched to the geo-referenced feature descriptors included in the annotated map data.

In various embodiments, different approaches may be utilized to combine visual information included in images captured by the vision system with the information of the annotated map data. Feature descriptors may be determined for the captured image and may subsequently be matched to geo-referenced feature descriptors included in the annotated map data. Information included in the annotated map data may also be retrieved before the feature descriptors are determined for a captured image, so as to aid the determination of feature descriptors for the image.

Figure 1:
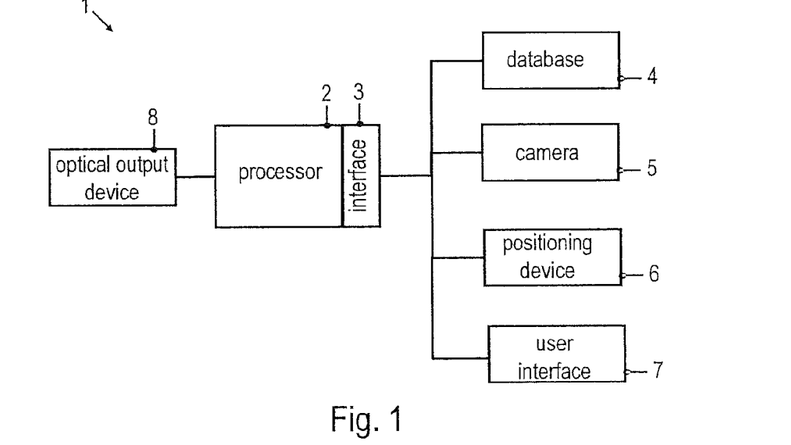
FIG. 1 is a block diagram illustration of a vision system.

FIG. 1 is a block diagram illustration of a vision system 1, which may be installed in a vehicle, or may be configured to be installed in a vehicle. The vision system 1 may be configured to interface with a navigation system or other vehicular system.

The vision system 1 includes a processor 2 having an interface 3, a database 4 storing annotated map data, a camera 5, a positioning device 6, and a user interface 7. In further embodiments, the positioning device 6 and/or the user interface 7 may be omitted. The processor 2 may include one or more integrated circuits. The annotated map data stored in the database 4 may include geo-referenced feature descriptors. The camera 5 may be configured to capture a 2D image upon actuation, or may be a video camera providing a sequence of 2D images as a function of time. While the processing of an individual 2D image will be described in more detail below, images of a video stream may be processed analogously. The positioning device 6 may be any module or combination of modules that is configured to provide a position and/or orientation. Exemplary implementations are based on GPS receivers that may be utilized to determine a position. The positioning device 6 may include a compass or other components for determining an orientation. The user interface 7 allows a user to input control commands. For example, the user interface 7 may allow a user to select one category or several categories of objects on which he desires to receive information.

The processor 2 is configured to combine visual information of an image captured by the camera 5 with the information provided by the annotated map data. The processor 2 may be configured to compute feature descriptors for the captured image and to match the feature descriptors to geo-referenced feature descriptors in the annotated map data. In one embodiment, the annotated map data stores feature descriptors, which may be arranged in feature values, and associated position information. The associated information may specify the position of an objects described by the feature descriptor(s). As will be described in more detail with reference to FIGS. 3-10, by combining the visual information of an image captured by the camera 5 with the information provided by the annotated map data, the processor 2 may be configured to enhance the speed and reliability of object recognition. In other embodiments, the processor 2 may be configured to determine a position and/or three parameters specifying an orientation of the vision system 1 based on the visual information of the image captured by the camera 5 when combined with the information provided by the annotated map data.

The visual system 1 may include, or may be coupled to, a functional entity 8. The processor 2 may provide a result of the image analysis obtained by utilizing the annotated map data stored in the database 4 to the functional entity 8, or may control the functional entity 8 based on the result of the image analysis.

The functional entity 8 may include a physical device, such as a display device. The processor 2 may then control the display device based on a result of the image analysis, which is performed using the annotated map data. For example, if the processor 2 identifies an object in the captured image using the annotated map data, the processor 2 may control the display device so that information on the identified object is output. In one embodiment, the processor 2 may control the display device so that the captured image or at least a portion thereof is displayed on the display device, while additional markings are superimposed on the displayed image to highlight the identified object or to provide additional information on the identified object. For further illustration, if the processor 2 identifies a vehicle orientation based on a result of the image analysis, which is performed using the annotated map data, the display device may be controlled based on the identified vehicle orientation. In one embodiment, the processor 2 may control the display device so that a portion of a vehicle environment is displayed on the display device, in a schematic or photographic representation, in a perspective view generated based on the determined vehicle orientation. If the vision system 1 is installed in a vehicle, the perspective view may be generated so as to correspond to a perspective view of the vehicle environment as seen from a driver's perspective.

The functional entity 8 may alternatively or additionally include a process performed by a processor of an electronic device. For illustration, the process may be a process performed by the processor of a navigation device installed onboard a vehicle, a process performed by a vehicle control system such as an automatic speed control or a parking aid, or a process performed by an augmented reality application onboard the vehicle. In an implementation, if the processor 2 identifies an object in the captured image using the annotated map data, the process 8 may utilize information on the object. Such information may include an object classification (e.g., POI, traffic sign, etc.). Alternatively or additionally, if the processor 2 identifies a vehicle orientation based on a result of the image analysis, which is performed using the annotated map data, the process 8 may utilize information on the vehicle orientation.

The processor 2 may combine the visual information of the image captured by the camera 5 and the a-priori information on feature descriptors and their associated positions stored in the annotated map data in various ways. For illustration, the processor 2 may selectively retrieve geo-referenced feature descriptors and/or their associated position information based on a current position determined by the positioning device 6 and based on the position information associated with feature descriptors included in the annotated map data. The processor 2 may perform an image analysis of the captured image to identify one or several of the retrieved geo-referenced feature descriptors in the image. For further illustration, the processor 2 may determine feature descriptors for the captured image and may retrieve geo-referenced feature descriptors stored in the database to subsequently match the feature descriptors determined for the captured image with geo-referenced feature descriptors. Procedures that may be performed by the processor 2 in various implementations will be explained in more detail with reference to FIGS. 3-10.

Figure 2:
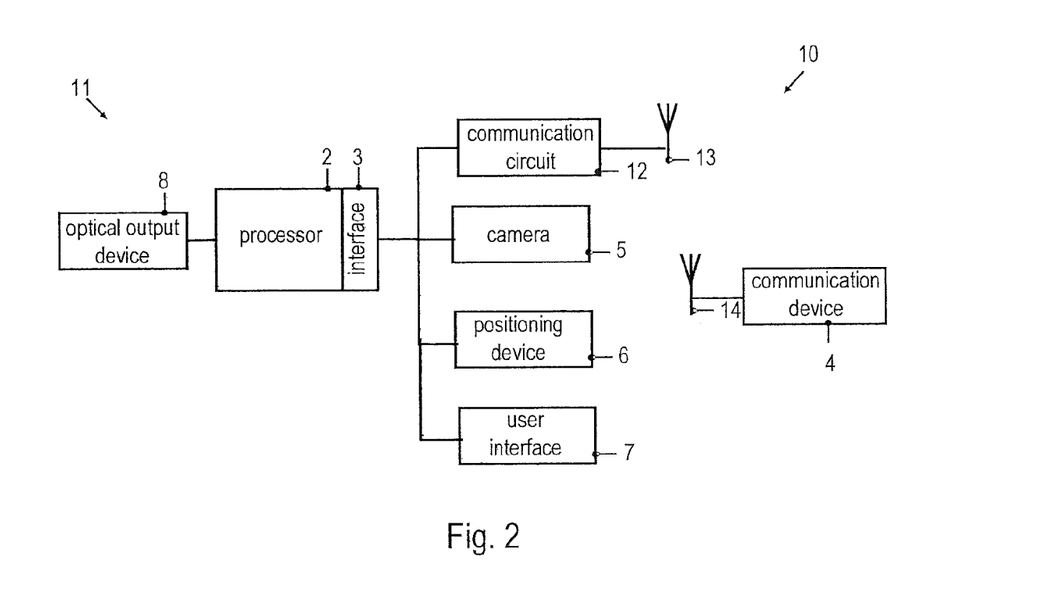
FIG. 2 is a block diagram illustration of a system comprising a vision system.

FIG. 2 is a block diagram illustration of a system 10 including a vision system 11 according to another embodiment. The vision system 11 communicates with a central server of a service provider, which includes a database 4. The vision system 11 may be installed in a vehicle, or may be configured to be installed in a vehicle. The vision system 11 may interface with a navigation system or other vehicular system. Elements or features of the vision system 11 which correspond with regard to construction and/or function, to elements or features of the vision system 1 of FIG. 1 are designated with the same reference numerals.

The vision system 11 includes a processor 2 having an interface 3, a camera 5, a positioning device 6, and a user interface 7, and a functional entity 8 that may be operative as described with reference to FIG. 1. In further embodiments, the positioning device 6 and/or the user interface 7 may be omitted. The vision system 11 further includes a communication circuit 12 and an associated antenna 13. The communication device formed by the communication circuit 12 and the antenna 13 allow the vision system 11 to wirelessly communicate with the central facility, which may include the database 4 of annotated map data and a corresponding communication device 14, which are illustrated in FIG. 2.

The processor 2 is configured to combine visual information of an image captured by the camera 5 with the information provided by the annotated map data. The processor 2 may be configured to request transmission of information on geo-referenced feature descriptors from the central facility to the visual system 11. The processor 2 may direct the communication circuit 12 to generate and transmit, via antenna 13, a request message. The request message may include information on a vehicle position determined by the positioning device 6. Alternatively or additionally, if the processor 2 has already determined feature descriptors for the captured image, the request message may include the feature descriptors or information related thereto.

The processor 2 may also be configured to receive, from the communication circuit 12, a message transmitted by the central facility. The message may include geo-referenced feature descriptors and/or position information associated with geo-referenced feature descriptors stored in the central facility. The processor 2 may combine the information of the annotated map data, as received from the central facility, with the visual information of the captured image.

The processor 2 may also be configured to direct the communication device 12 to transmit a message including feature descriptors determined for the captured image and associated position information, as provided by the positioning device 6. The message may include additional information, such as a textual description of the object represented by the feature descriptors, which may be input via the user interface 7. The processor 2 may transmit this message including feature descriptors selectively if no feature descriptors representing the object are included in the annotated map data, yet. To this end, the processor 2 may generate the message including feature descriptors via the communication device if a message received from the central facility indicates that no feature descriptors are available in a neighborhood of a current position. A local database 4 storing annotated map information may also be provided in the vision system 11, or the vision system 1 of FIG. 1 may include a communication device as explained with reference to FIG. 2. The processor 2 may then transmit a message including feature descriptors to a central facility, via the communication device of the vision system, if the feature descriptors determined for the image do not have a match in the local database 4. Thereby, a database maintained by a central facility may be updated. This may in particular be advantageous if a plurality of vision systems 11 are respectively configured to wirelessly transmit information on feature descriptors, or on captured images, to the central facility in a community application scenario.

In the vision system 11, the processing of the image captured by the camera 5 may be performed according to any one of the methods explained with reference to the vision system 1 of FIG. 1. Exemplary implementations of methods in which the visual information contained in an image is combined with geo-referenced feature descriptors stored in a database will be explained in more detail with reference to FIGS. 3-10.

Figure 3:
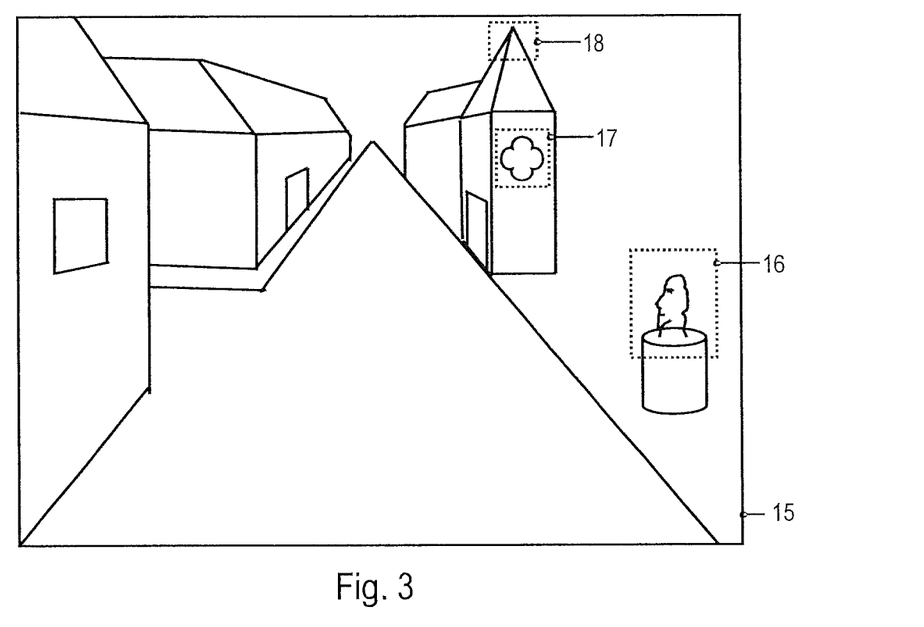
FIG. 3 is a pictorial illustration of a captured image.

FIG. 3 is a schematic representation of an exemplary image 15 captured by the camera of a vision system of an embodiment. The image 15 shows pronounced features 16-18, which may at least to a certain extent, be characteristic in the sense that they have distinguishing shapes, sizes, colors, or similar Frequently, points of interest (POIs) may have such pronounced features.

In automated vision systems, such as the vision systems 1 and 11 of FIGS. 1 and 2, respectively, feature descriptors may be computed for an image. There are various ways to compute feature descriptors. In simple embodiment for example, the set of feature descriptors representing an object, such as one of objects 16-18, may be a subset of pixel values of the image. Advantageously, the visual system of embodiments may employ feature descriptors that exhibit at least a certain degree of robustness against varying conditions, such as varying viewing directions, varying lighting conditions, etc. Correspondingly, the geo-referenced feature descriptors stored in the annotated map data may be of the same type as the feature descriptors determined by the processor of the visual system. Examples for feature descriptors which provide a certain degree of robustness include SIFT-descriptors, SURF-descriptors, RIFT-descriptors, G-RIF-descriptor, PCA-SIFT-descriptors or GLOH-descriptors, without being limited thereto. Procedures for determining such descriptors are known to the person skilled in the art of automated vision systems.

In various implementations, different procedures may be invoked to utilize the information provided by annotated map data in analyzing an image.

The processor of a vision system may access the annotated map data to retrieve information therefrom and may subsequently use the retrieved information, for example, for object recognition in the captured image. The processor may utilize position information associated with the geo-referenced feature descriptors when determining feature descriptors for the captured image. Alternatively or additionally, the processor may utilize the values of the feature descriptors as stored in the annotated map data and may search the image for corresponding feature descriptors.

The processor of a vision system may determine feature descriptors for the captured image and may subsequently match the determined feature descriptors to geo-referenced feature descriptors stored in the annotated map.

Figure 4:
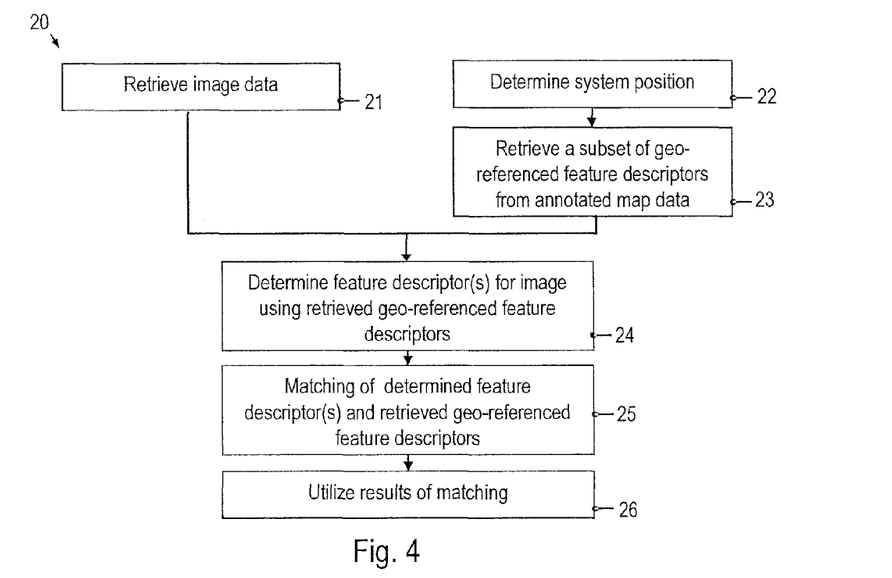
FIG. 4 is a flowchart illustration of a method of analyzing an image.

FIG. 4 is a flowchart illustration of a method 20 of analyzing an image, in which annotated map data are utilized. The annotated map data include geo-referenced feature descriptors. The method 20 may be performed by the vision system 1 of FIG. 1, or by the vision system 11 illustrated in FIG. 2.

Image data are retrieved in step 21. The image data may be a 2D image taken in a single shot of a 2D image sensor, or may be a 2D image included in a video sequence. The image data may be retrieved by the processor of the vision system. The image data may be retrieved from a camera.

A position of the vision system is determined in step 22. The system position may be determined by a positioning device which may operate, for example, based on GPS, Galileo positioning, MTSAT positioning, Compass positioning, terrestrial positioning methods or any other positioning standard.

Data is retrieved in step 23 from the annotated map data. Retrieving data may be based on the vehicle position determined at step 22. The subset of data may include, at least, feature descriptors and/or their associated position information for feature descriptors arranged in a neighborhood of the determined vehicle position. The subset of data may further be retrieved based on an orientation of the vision system. For a vision system installed in a vehicle, the subset of data retrieved from the annotated map may be selected based on a vehicle position and based on the vehicle orientation. Thereby, the retrieval of geo-referenced feature descriptors arranged on the side of the vehicle that cannot be seen in the image may be avoided.

A feature descriptor, or typically a plurality of feature descriptors, is determined for the retrieved image in step 24. The feature descriptor is determined utilizing the retrieved geo-referenced feature descriptors. The position information associated with the retrieved geo-referenced feature descriptors may be used to predict the location of an object in the image. To this end, an image portion in which the object is expected to be located may be identified, based on the position information associated with a geo-referenced feature descriptor and the position of the vision system determined in step 22. The image portion in which the object is expected to be located may further be determined based on the optical characteristics of the camera. The image portion in which the object is expected to be located may further be determined based on the orientation of an optical axis of the camera.

In step 25 a matching of the feature descriptor(s) determined for the image and the retrieved geo-referenced feature descriptor(s) is performed. The matching may be performed using any one of a variety of known procedures. For illustration, for feature descriptors arranged in a feature vector, a projection, or scalar product, of the feature vector determined for the image and one feature vector, or various different feature vectors, stored in the annotated map may be computed. Any other measure quantifying the similarity between the visual appearance of the object in the image, as specified by the feature vector, and a feature vector stored in the annotated map data may be used. Naturally, it is not required that there is a perfect match between determined feature descriptors and geo-referenced feature descriptors stored in the annotated map data. Rather, matching entries may be identified by comparing a similarity measure of feature descriptors determined for the image and retrieved from the annotated map data to a threshold value.

In step 26 the result of the matching is provided to another process or device. In one embodiment, after feature descriptor(s) in the annotated map data have been determined which match the feature descriptor(s) determined for the image, information on the respective object may be output. The information on the object may be output via a graphical user interface in textual or graphical form. For example, textual information relating to a historical landmark may be retrieved and displayed. The object may also be highlighted with graphical markings on a display on which the image is shown. The outputting of information on the object may be selectively performed based on a user setting. For example, the vision system 1 or 11 of FIGS. 1 and 2, respectively, may be configured to allow a user to specify a class of objects in which he is particularly interested. Inputting of such a selection may be performed via the user interface 7. The annotated map data may include information on the classes of objects represented by the geo-referenced feature descriptor(s). Exemplary classes may include landmarks, shops, gas stations, etc. The processor of the vision system may retrieve the class information for geo-referenced feature descriptor(s) which match feature descriptor(s) determined for the image. The processor may compare the retrieved class information to the user-defined setting and may selectively output graphical markings for those objects only for which the user has requested to be provided with information.

In step 26, the result of the matching may be provided to other processes performed in the vision system or a system connected thereto. For illustration, for a vehicle vision system, the results of the matching may be provided to a navigation device, to an augmented reality application, etc. The results of the matching may also be utilized to determine whether the retrieved image or the feature descriptor(s) determined for the image are to be transmitted to a central facility of a service provider. A message including the image or feature descriptor(s) determined for the image may selectively be generated and transmitted to a central facility of the service provider if no matching entry has been found in the annotated map data.

Various modifications of the method 20 may be implemented in further embodiments. For example, while step 21 and steps 22, 23 are shown to be performed in parallel, these steps may also be performed sequentially.

Figure 5:
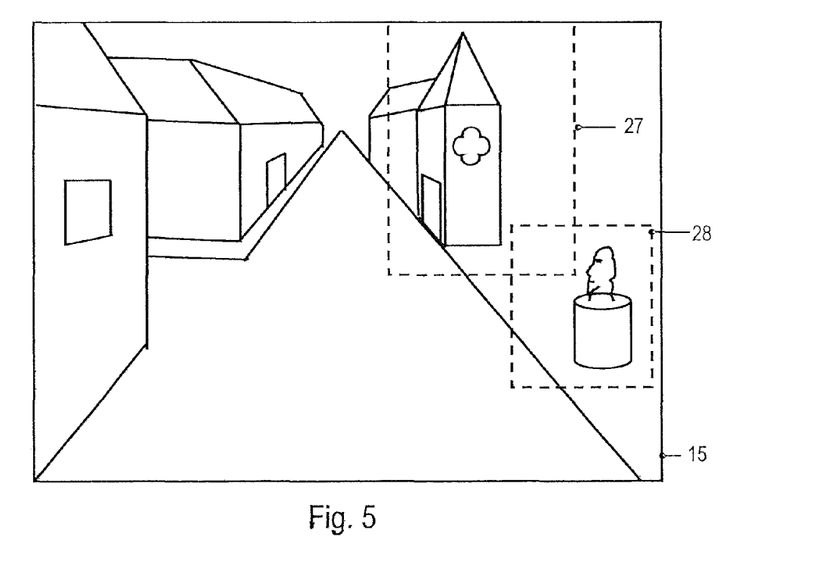
FIG. 5 is a pictorial illustration showing the captured image of FIG. 3 for explaining systems and methods of the present invention.

FIG. 5 illustrates determining of feature descriptor(s) using the annotated map data.

Assuming that a geo-referenced feature vector representing a first object, such as a church tower, and associated position information has been retrieved from the annotated map data, a processor of a vision system may determine an image portion 27 in which the first object is expected to be located. The image portion 27 may be determined based on the position information associated with the geo-referenced feature vector representing the first object, the position of the vision system, optical characteristics of the camera, and the orientation of an optical axis of the camera. Similarly, assuming that a geo-referenced feature vector representing a second object, such as a statue or bust, and associated position information has been retrieved from the annotated map data, the processor of the vision system may determine an image portion 28 in which the second object is expected to be located. The image portion 28 may be determined based on the position information associated with the geo-referenced feature vector representing the second object, the position of the vision system, optical characteristics of the camera, and the orientation of an optical axis of the camera.

Figure 6:
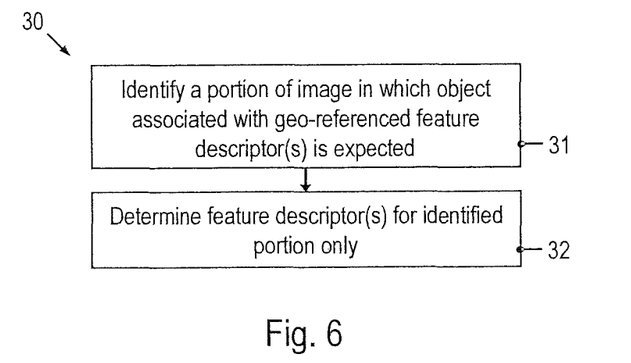
FIG. 6 is a flowchart illustration of a procedure of determining feature descriptors.

FIG. 6 illustrates a procedure 30 for determining feature descriptor(s) for an image using annotated map data. The procedure may implement the determining step 24 in the method 20 of FIG. 4.

A portion of the image is identified in step 31 in which an object represented by geo-referenced feature descriptor(s) stored in the annotated map data is expected to be located. As mentioned above, the portion of the image may be determined based on the position information associated with the geo-referenced feature descriptor(s) representing the object and the position of the vision system. Additionally, optical characteristics of the camera and the orientation of an optical axis of the camera may be taken into account when identifying the portion of the image.

Determining of the feature descriptor(s) is selectively performed in step 32 for the portion of the image identified in step 31. The identification of the object in the image is thereby made computationally reduced, in terms of computation time, as compared to a conventional approach where the whole image has to be analyzed to identify a match.

Figure 7:
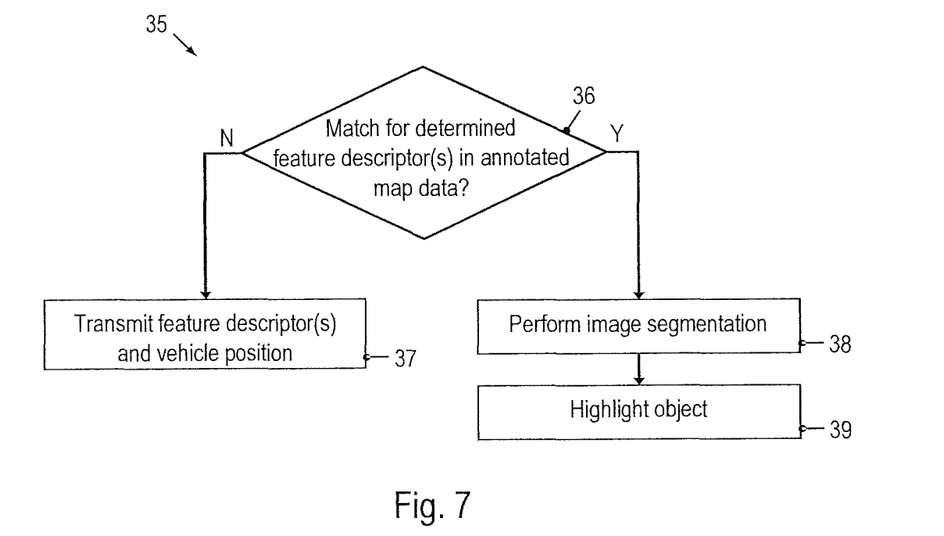
FIG. 7 is a flowchart illustration of a procedure of utilizing the results of a matching between feature descriptors determined for a captured image and geo-referenced feature descriptors.

FIG. 7 illustrates a procedure 35 that may be invoked in a vision system having a wireless communication device. The procedure may implement step 26 in the method 20 of FIG. 4.

In step 36 it is determined whether feature descriptor(s) determined for the image can be matched to geo-referenced feature descriptor(s) stored in the annotated map data.

If the feature descriptor(s) determined for the image can be matched to geo-referenced feature descriptor(s) stored in the annotated map data, then in step 38, image segmentation may be performed. In step 39, the object may be provided with a graphical marking when the image is displayed. As mentioned above, the displaying of graphical marking to highlight an object may be selectively performed based on a user selection of object classes for which the user requests to be provided with information.

If one or several feature descriptor(s) determined for the image cannot be matched to geo-referenced feature descriptor(s) stored in the annotated map data, then in step 37 a message including the one or several feature descriptor(s) determined for the image is transmitted via a communication device. The message may include a position of the vision system at the time at which the image has been captured. While it is advantageous in terms of traffic data loads to transmit the message including the feature descriptor(s), in another embodiment, the captured image and the position of the vision system at the time at which the image has been captured may be transmitted. A central facility of a service provider may then analyze the image to extract the feature descriptor(s) at the central location for storage in the annotated map data.

The transmission step 37 may be selectively performed based on a user input. For example, in one embodiment, the transmission at 37 may be performed after the user confirmed that it is desired to transmit the feature descriptor(s) or the captured image to a central location. Alternatively or additionally, the user may be allowed to input additional information, such as a textual description of the object or object classification, which may then be transmitted together with the message including the feature descriptor(s) determined for the image.

Figure 8:
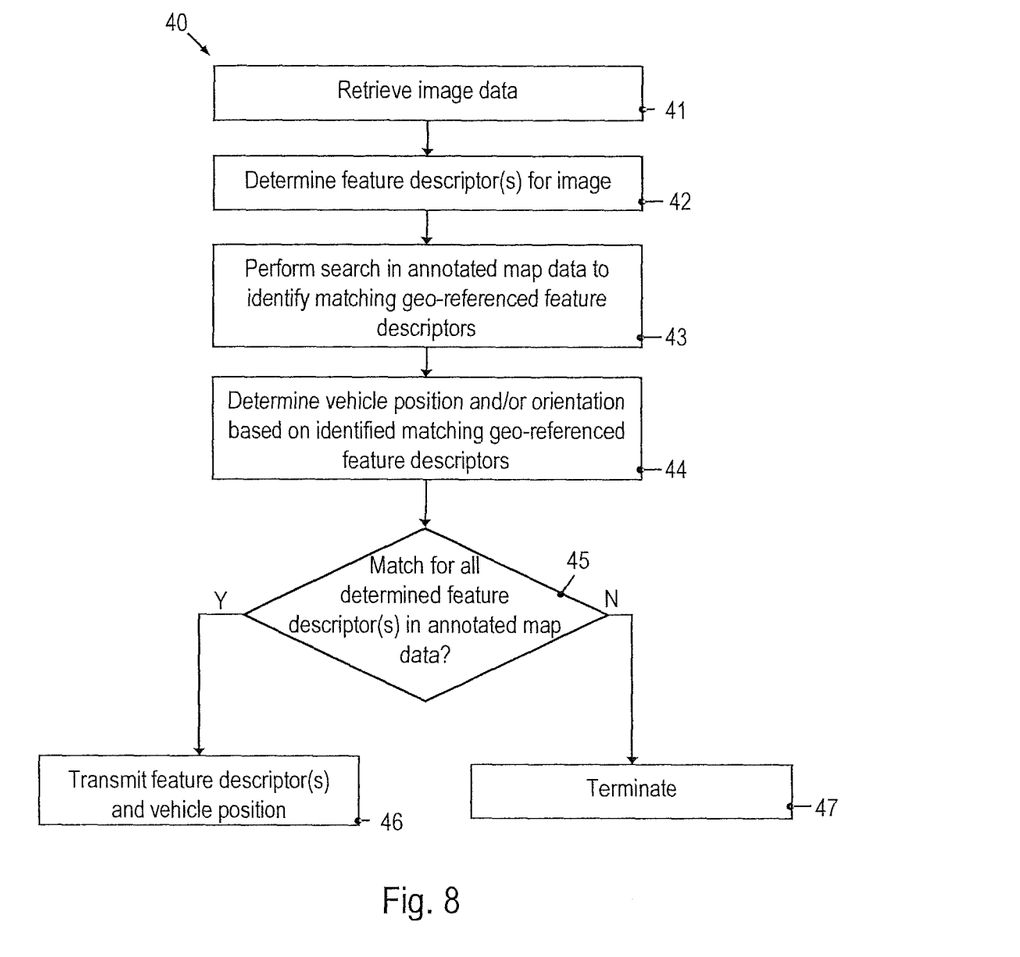
FIG. 8 is a flowchart illustration of a method according to another embodiment.

FIG. 8 is a flowchart illustration of a method 40 of analyzing an image, in which annotated map data are utilized. The annotated map data include geo-referenced feature descriptors. The method 40 may be performed by the vision system 1 of FIG. 1 or by the vision system 11 of FIG. 2.

In step 41 image data are retrieved. The image data may be a 2D image taken in a single shot of a 2D image sensor, or may be a 2D image included in a video sequence. The image data may be retrieved by the processor of the vision system. The image data may be retrieved from a camera.

In step 42 a plurality of feature descriptors is determined for the retrieved image.

In step 43 a search is performed in the annotated map data to identify geo-referenced feature descriptors stored in the annotated map data, which match the feature descriptors determined in step 42. It is not required that there is a perfect match between determined feature descriptors and geo-referenced feature descriptors stored in the annotated map data in order to identify a match. Rather, matching geo-referenced feature descriptors may be identified by comparing a similarity measure of feature descriptors determined for the image and retrieved from the annotated map data to a threshold value. A structured search may be performed to identify the matching geo-referenced feature descriptors. The annotated map data may have a hierarchical tree-like structure which facilitates such a structured search.

In step 44 a position and/or orientation of a vehicle in which the vision system is installed may be determined based on the position information associated with the geo-referenced feature descriptors that match the feature descriptors determined for the image. In an implementation, a triangulation may be performed to determine the vehicle position and/or orientation. In another implementation, the expected location of the objects represented by the matching geo-referenced feature descriptors may be computed for a plurality of different vehicle positions and orientations. An optimization procedure may be performed to identify the vehicle position and orientation that yields best agreement with the location of the feature descriptors determined in step 42. The optimization procedure may be performed based on optical characteristics of the camera of the vision system.

The vehicle position and/or orientation determined in step 44 may be provided to another device installed in the vehicle or to another process. For illustration, the vehicle position and/or orientation may be utilized for augmented reality application, navigation purposes, or similar.

Referring to steps 45-47, feature descriptor(s) that cannot be matched to geo-referenced feature descriptors stored in the annotated map data may be selectively transmitted to a central facility. Steps 45 and 46 may be implemented in the same way as steps 36 and 37 of the procedure 30 of FIG. 7. If all feature descriptors determined for the image have a matching geo-referenced feature descriptor in the annotated map data, the method may terminate at step 47.

Various modifications of the method 40 may be implemented in further embodiments. For example, a positioning device that provides a position estimate which is independent of a captured image may be utilized. The position estimate may also be taken into account when determining the vehicle position and/or orientation. In one embodiment, a first estimate for the vehicle position may be determined based on the position determined by the positioning device. The vehicle orientation and/or a better estimate for the vehicle position may then be determined using the position information of the geo-referenced feature descriptors stored in the annotated map data, as described above.

The position information stored in the annotated map data may define not only the lateral position of the object represented by the respective feature descriptor(s), but may also include height information. This allows all three coordinates of the orientation of the vehicle to be determined. That is, not only the projection of the vehicle longitudinal axis relative to a horizontal plane, but also the angle between the vehicle longitudinal axis and the horizontal plane may be determined.

Figure 9:
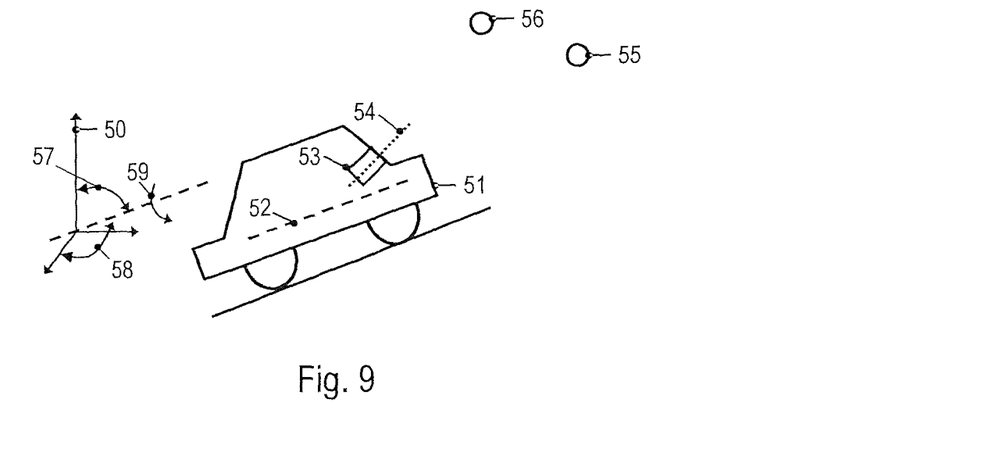
FIG. 9 is a schematic diagram for explaining the method of FIG. 8.

FIG. 9 is a schematic illustration for explaining the method 40 illustrated in FIG. 8. Referring to FIG. 9, schematically shown are a coordinate system 50 and a vehicle 51 having a longitudinal axis 52. A vision system is installed in the vehicle 51. The vision system includes a camera 53 having an optical axis 54. The orientation of the optical axis 54 relative to the longitudinal axis 52 of the vehicle is generally known.

By matching feature descriptors determined for an image captured with the camera 53 to geo-referenced feature descriptors stored in the annotated map data, objects 55 and 56 may be identified in the image by combining the visual information of the image with the information included in the annotated map data. The positions of the objects 55 and 56, or of a characteristic point thereof, in the coordinate system 50 may be retrieved from the annotated map data. The positions may include a height coordinate of the objects 55, 56. By performing triangulation or an optimization procedure, the orientation of the optical axis 54 may be determined. The orientation of the optical axis 54 may, for example, be defined in terms of three Euler angles specifying its position relative to the coordinate system 50. With the relative orientation of the optical axis 54 and the vehicle longitudinal axis 52 being known, the orientation of the vehicle longitudinal axis 52 may be determined. The orientation of the longitudinal axis 52 may, for example, be defined in terms of three Euler angles 57-59 specifying its position relative to the coordinate system 50. The angles 57, 58 define the orientation of the longitudinal axis 52 in space. The angle 59 defines the rotational position of the vehicle around its longitudinal axis 52. Alternatively, the orientation of the optical axis 54 may be determined to define the vehicle orientation in space, or the orientation of a transverse axis of the vehicle may be determined in space. The orientation may be respectively defined by three Euler angles or any other parameterization of orientations.

The determined vehicle orientation may be used in augmented reality applications. For illustration, in augmented reality, processor-generated graphics may be superimposed on captured image data to aid the user in certain tasks. Examples for such data include arrows indicating driving directions. The position at which the processor-generated graphics are shown on a display, and/or the orientation at which the processor-generated graphics are shown on the display, may be set as a function of the coordinates which define the vehicle orientation in space.

Figure 10:
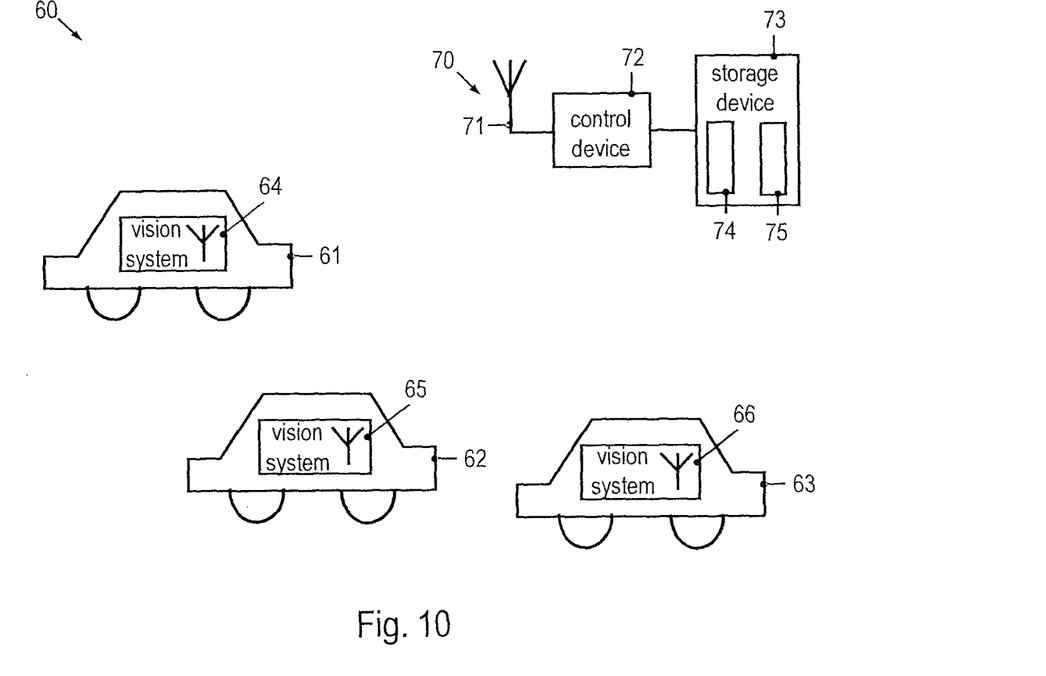
FIG. 10 is block diagram illustration of a system comprising several vision systems according to an aspect of the present invention.

FIG. 10 illustrates a system 60 that includes a plurality of vehicles 61-63 and a central facility 70 of a service provider. At least one of the vehicles 61-63 is provided with a vision system. For example, the vehicles 61-63 may respectively be equipped with a vision system 63-66, which is a vision system according to an embodiment of the present invention. The vision systems 63-66 respectively include a wireless communication device for communication with the central facility.

The vision systems 63-66 may respectively be configured to capture an image, to determine feature descriptor(s) for the captured image, and to perform a matching between the determined feature descriptor(s) and geo-referenced feature descriptor(s) stored in annotated map data. The vision systems 63-66 may request information from the central facility 70 in order to match feature descriptors determined for a captured image and geo-referenced feature descriptors. Alternatively or additionally, local databases storing annotated map data may be provided in at least some of the vision systems 63-66.

The central facility 70 includes an antenna 71, a control device 72 and a storage device 73. The storage device 73 comprises a database 74 of annotated map data that includes geo-referenced feature descriptors. The storage device 74 may also include a database 75 of conventional map data.

A process for providing requesting vision systems with annotated map data may be implemented in the central facility 70. The control device 72, which may be a computer, may evaluate a message received from one of the vision systems 64-66 to determine whether the respective vision system requests annotated map data to be transmitted thereto. In response to the request message, the control device 72 may generate a response including annotated map data. The response message may be generated based on a position information included in the request message. The control device 72 may selectively include geo-referenced feature descriptors in the response message which have associated position information located in proximity to a position of the requesting vision system.

Alternatively or additionally, the request message may include feature descriptors determined by the requesting vision system. The control device 72 may generate the response message based on the feature descriptors included in the request message. The response message may be generated so as to include position information of geo-referenced feature descriptors determined by matching the feature descriptors included in the request message to the geo-referenced feature descriptors stored in the annotated map data.

Further, a process for adding new information to the annotated map data may be implemented in the system 60. In one embodiment, a vision system 64-66 may transmit a message including feature descriptor(s) determined for an image. The message may include position information. The control device 72 may store the received feature descriptor(s) and the associated position information in the annotated map data 74 if the annotated map data 74 does not yet include an entry matching the determined feature descriptor(s) that are received from one of the vision systems. The message transmitted by the vision system 64-66 may include additional information, such as textual information or a classification specified by a user of the respective vision system.

Alternatively or additionally, the vision system 64-66 may transmit the captured image rather than the feature descriptor(s) determined for the image. The control device 72 may then determine the feature descriptor(s), may perform a matching to geo-referenced feature descriptor(s) stored in the annotated map data 74 and may selectively store the feature descriptor(s) determined for the image if there is no matching entry in the annotated map data.

In a community scenario as illustrated in FIG. 10, in which a plurality of vision systems 64-66 cooperate with the central facility 70, the amount of data in the annotated map data may be increasing upon use of the vision systems 64-66. This facilitates maintenance of the annotated map data and reduces costs.

While the various embodiments of the invention have been described with reference to the drawings, various modifications and alterations may be implemented in other embodiments. For example, while some embodiments have been described in the context of vision systems, vision systems and methods of analyzing an image according to embodiments may also be realized in other environments. In addition, while some embodiments have been described in the context of providing information on POIs to a user via an optical output device, the information obtained by combining the visual information of an image and the information included in the annotated map data may also be utilized in different ways. Examples include vehicle navigation or augmented reality applications.

Although the present invention has been illustrated and described with respect to several preferred embodiments thereof, various changes, omissions and additions to the form and detail thereof, may be made therein, without departing from the spirit and scope of the invention.

What is claimed is:

1. A vehicle vision system, comprising:
    a camera installed in a car and configured to capture at least one image; and
    a processor coupled to the camera and configured to determine at least one feature descriptor for the at least one image; and
    a wireless communication device;
    the processor having an interface coupled to the wireless communication device to access annotated map data including geo-referenced feature descriptors to retrieve over the wireless communication device a plurality of geo-referenced feature descriptors and position information respectively associated with the geo-referenced feature descriptors,
    where the processor is configured to perform a matching procedure between the at least one feature descriptor determined for the at least one image and the retrieved geo-referenced feature descriptors, where the processor is configured to transmit the at least one image to a server over the wireless communication device selectively if no match is found for the at least one feature descriptor determined for the at least one image in the matching procedure,
    where the processor is configured to control an optical output device such that both a position and an orientation at which graphics are output by the optical output device are controlled based on an angle which defines a rotational position of the car around its longitudinal axis determined by the matching procedure.

2. The vehicle vision system of claim 1, where the processor is configured to identify a set of geo-referenced feature descriptors matching a plurality of feature descriptors determined for the at least one image, and to determine three coordinates of a vehicle orientation based on the position information associated with the set of geo-referenced feature descriptors.

3. The vehicle vision system of claim 2, where the three determined coordinates of the vehicle orientation define three angles.

4. The vehicle vision system of claim 3, where for at least one of the geo-referenced feature descriptors, the associated position information includes a height coordinate.

5. The vehicle vision system of claim 1, further comprising:
    a positioning device configured to determine a vehicle position,
    where the processor is coupled to the positioning device and is configured to retrieve the plurality of geo-referenced feature descriptors based on the vehicle position.

6. The vehicle vision system of claim 5, where the processor is configured to estimate a location of an object in the at least one image based on a position information associated with at least one of the retrieved geo-referenced feature descriptors and based on the vehicle position.

7. The vehicle vision system of claim 6, the positioning device being further configured to determine a vehicle orientation, the processor being configured to estimate the location of the object further based on the vehicle orientation.

8. The vehicle vision system of claim 5, where the processor is configured to identify a portion of the at least one image based on the vehicle position and based on position information associated with at least one of the plurality of retrieved geo-referenced feature descriptors,
    the processor being configured to selectively determine the at least one feature descriptor for the identified portion of the image.

9. The vehicle vision system of claim 1, where the geo-referenced feature descriptors included in the annotated map data are respectively associated with at least one of a plurality of object categories, and the processor is configured to selectively perform the matching between the at least one feature descriptor determined for the at least one image and the retrieved geo-referenced feature descriptors which are associated with a selected object category.

10. The vehicle vision system of claim 1, further comprising an optical output device, the processor being configured to control the optical output device to output information indicating an object in the at least one image which has a feature descriptor matching one of the retrieved geo-referenced feature descriptors.

11. The vehicle vision system of claim 1, where at least one of the geo-referenced feature descriptors comprises an associated position information including a height information, the processor being configured to perform the matching procedure based on the height information.

12. The vehicle vision system of claim 1, where the annotated map data include a plurality of geo-referenced feature vectors respectively formed from a plurality of feature descriptors, each of the geo-referenced feature vectors having an associated position information stored in the database, the processor being configured to determine a feature vector for the at least one image, the determined feature vector including a plurality of feature descriptors, and to match the feature vector determined for the at least one image to a feature vector stored in the database.

13. The vehicle vision system of claim 1, the processor is configured to transmit a request message via the wireless communication device to request transmission of the plurality of geo-referenced feature descriptors to the vehicle vision system and to retrieve the plurality of geo-referenced feature descriptors over the wireless communication device in response to transmitting the request message.

14. The vehicle vision system of claim 1, where the at least one feature descriptor determined for the at least one image being selected from a group comprising a Scale-Invariant Feature Transform (SIFT) descriptor, a Speeded Up Robust Features (SURF) descriptor, a Rotation Invariant Feature Transform (RIFT) descriptor, a Generalized Robust Invariant Feature (G-RIF) descriptor, a Principal Components Analysis SIFT (PCA-SIFT) descriptor or a Gradient Location and Orientation Histogram (GLOH) descriptor.

15. The vehicle vision system of claim 1, where the at least one feature descriptor determined for the at least one image is selected from a group consisting of a Rotation Invariant Feature Transform (RIFT) descriptor, a Generalized Robust Invariant Feature (G-RIF) descriptor, and a Gradient Location and Orientation Histogram (GLOH) descriptor.

16. A method for analyzing at least one image captured onboard a vehicle, the method comprising:
    capturing the at least one image by a camera installed in the vehicle;
    determining at least one feature descriptor for the at least one image;
    retrieving via a wireless communication device a plurality of geo-referenced feature descriptors and position information respectively associated with the geo-referenced feature descriptors;
    performing a matching procedure between the at least one feature descriptor determined for the at least one image and the retrieved geo-referenced feature descriptors; and
    selectively transmitting the at least one image to a server over the wireless communication device if no match is found for the at least one feature descriptor in the matching procedure,
    controlling an optical output device such that both a position and an orientation at which graphics are output by the optical output device are controlled based on an angle which defines a rotational position of the vehicle around its longitudinal axis determined by the matching procedure.

17. The method of claim 16, further comprising:
    identifying in the matching procedure wherein a set of geo-referenced feature descriptors matching a plurality of feature descriptors determined for the at least one image are identified; and
    determining three coordinates of a vehicle orientation based on the position information associated with the set of geo-referenced feature descriptors, the three coordinates of the vehicle orientation defining three angles.

18. The method of claim 16, where the at least one feature descriptor determined for the at least one image is selected from a group consisting of a Rotation Invariant Feature Transform (RIFT) descriptor, a Generalized Robust Invariant Feature (G-RIF) descriptor, and a Gradient Location and Orientation Histogram (GLOH) descriptor.

* * * * *